(12) United States Patent
Fujimoto et al.

(10) Patent No.: US 8,159,789 B2
(45) Date of Patent: Apr. 17, 2012

(54) SUSPENSION FOR SUPPORTING A MAGNETIC HEAD SLIDER

(75) Inventors: Yasuo Fujimoto, Kyoto-fu (JP); Kenji Mashimo, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 239 days.

(21) Appl. No.: 12/691,235

(22) Filed: Jan. 21, 2010

(65) Prior Publication Data

US 2010/0202087 A1     Aug. 12, 2010

(30) Foreign Application Priority Data

Jan. 22, 2009   (JP) .................. 2009-011901

(51) Int. Cl.
*G11B 5/48* (2006.01)
(52) U.S. Cl. ........................ 360/265.9; 360/244.6
(58) Field of Classification Search ............... 360/265.9, 360/266, 266.1, 244.2, 244.5, 244.6
See application file for complete search history.

(56) References Cited

U.S. PATENT DOCUMENTS

| | | | | |
|---|---|---|---|---|
| 5,495,375 A * | 2/1996 | Baasch et al. | ............... | 360/266.1 |
| 5,497,282 A * | 3/1996 | Hoffmann et al. | ............ | 360/244 |
| 5,717,545 A * | 2/1998 | Brooks et al. | ............... | 360/244.6 |
| 5,862,019 A * | 1/1999 | Larson | ....................... | 360/265.8 |
| 6,424,497 B1 * | 7/2002 | Coon | .......................... | 360/244.6 |
| 6,456,463 B1 * | 9/2002 | Van Sloun | ................. | 360/266.1 |
| 6,754,044 B1 * | 6/2004 | Braunheim et al. | ........ | 360/244.6 |
| 6,941,641 B2 * | 9/2005 | Van Sloun | ................. | 29/603.03 |
| 6,950,285 B2 * | 9/2005 | Wada et al. | ................. | 360/265.7 |
| 6,961,219 B2 * | 11/2005 | Asano et al. | ................... | 360/266 |
| 7,170,716 B2 * | 1/2007 | Van Sloun et al. | ......... | 360/244.6 |
| 7,324,307 B2 * | 1/2008 | Brink et al. | ................. | 360/244.6 |
| 7,471,488 B1 * | 12/2008 | Zhang | ......................... | 360/244.5 |
| 7,889,459 B2 * | 2/2011 | Lee et al. | .................... | 360/244.5 |
| 2002/0093771 A1 * | 7/2002 | Holaway et al. | .............. | 360/266 |
| 2003/0007294 A1 * | 1/2003 | McReynolds et al. | ..... | 360/265.9 |
| 2005/0157430 A1 * | 7/2005 | Korkowski et al. | ........ | 360/265.9 |

FOREIGN PATENT DOCUMENTS

JP   3340103   8/2002

* cited by examiner

*Primary Examiner* — Brian Miller
(74) *Attorney, Agent, or Firm* — Sterne, Kessler, Goldstein & Fox PLLC

(57) ABSTRACT

It is an object to achieve prevention of lowering resonant frequency and improved production efficiency while achieving reduction in weight of a supporting part with a boss portion and reduction in thickness at area at which the boss portion is located. In the present invention, the supporting part includes a first supporting member with which a load bending part is connected, and a second supporting member with the boss portion and a main body region extended radially outward from the boss portion. At least one of the inner periphery of the mount hole and the outer periphery of the main body region is integrally provided with a rib region. The first and second supporting members are connected to each other by a restoring force of the rib region that has been elastically and/or plastically deformed by the other one of the inner periphery of the mount hole and the outer periphery of the main body region with the main body region being located at least partially in the mount hole in a through-thickness direction.

7 Claims, 14 Drawing Sheets

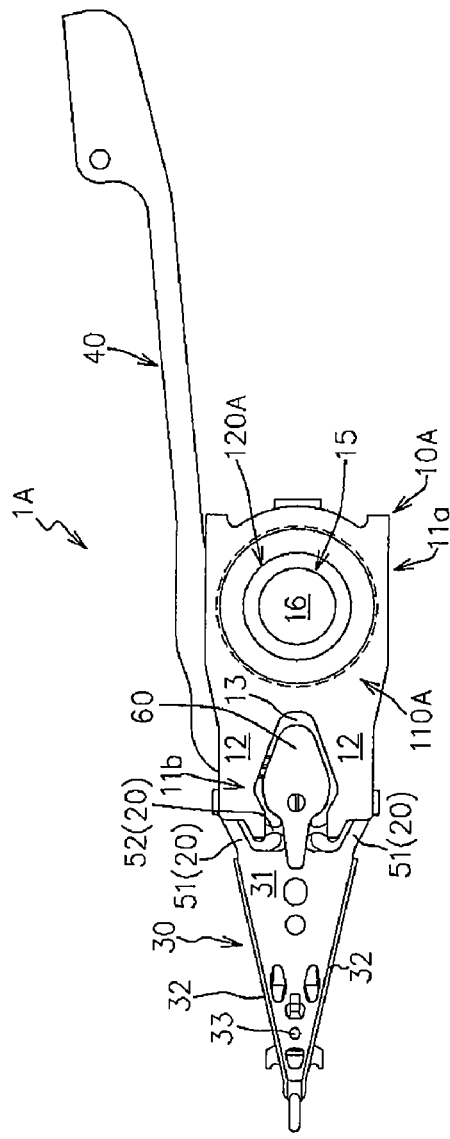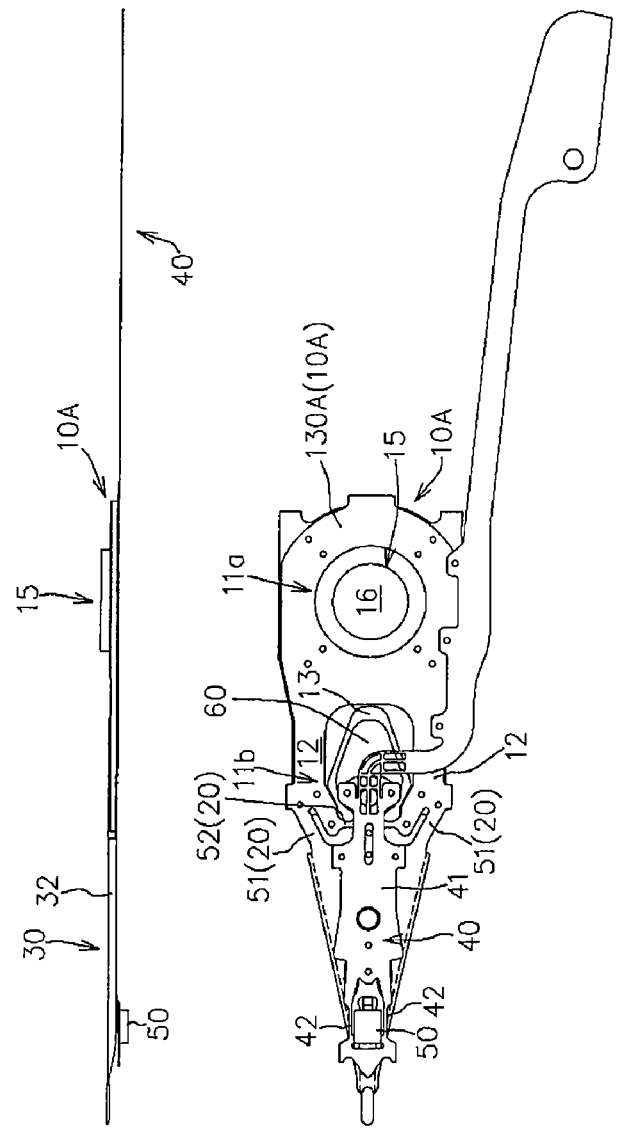

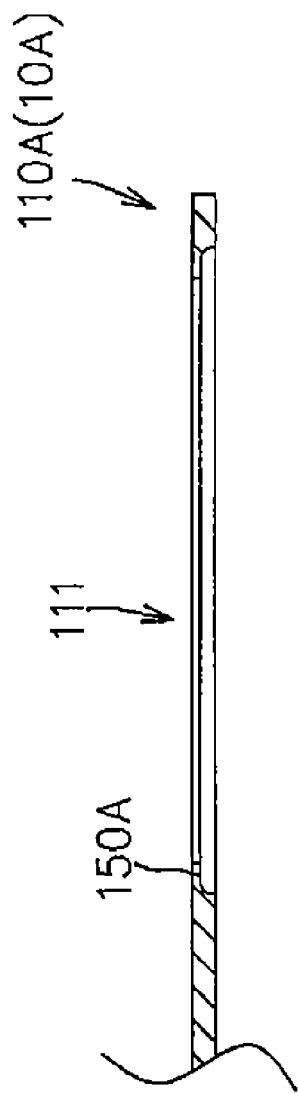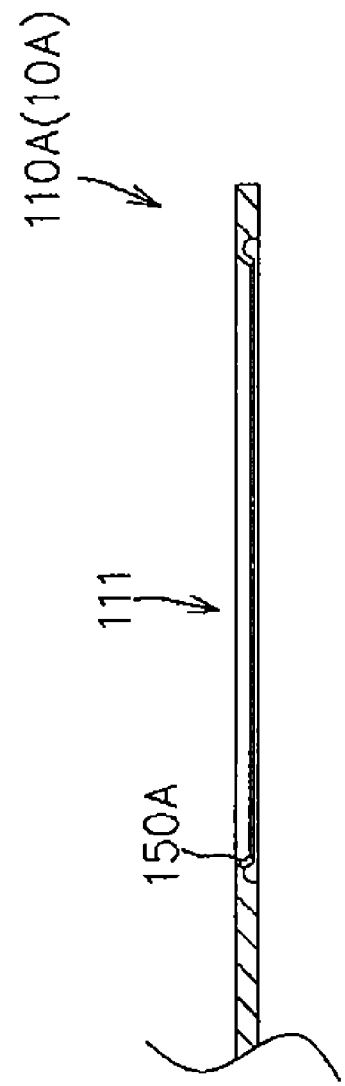

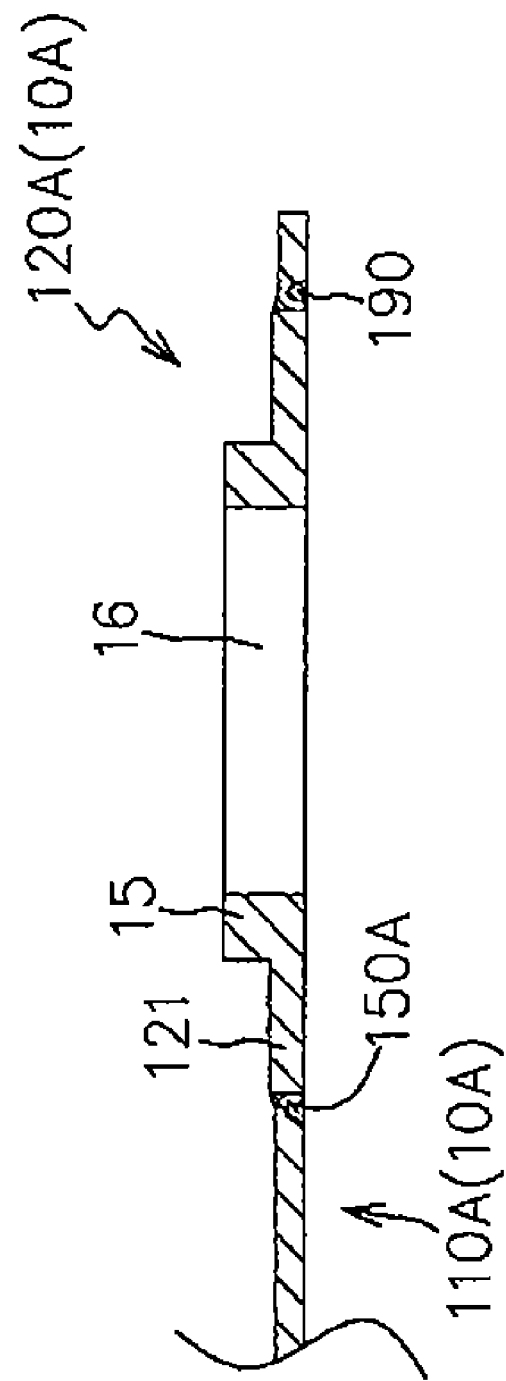

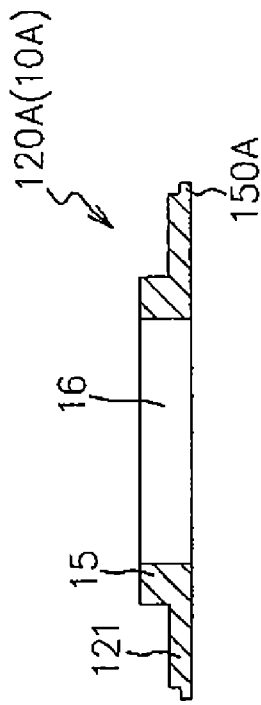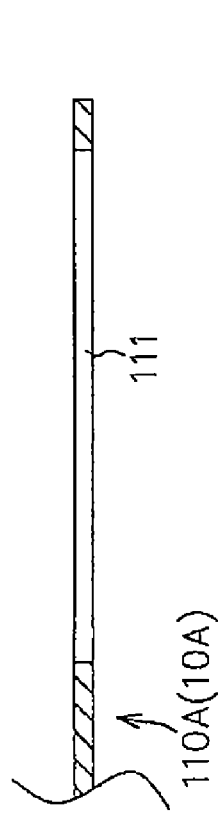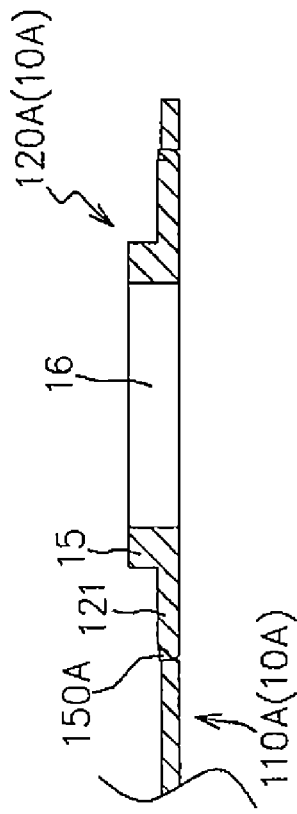

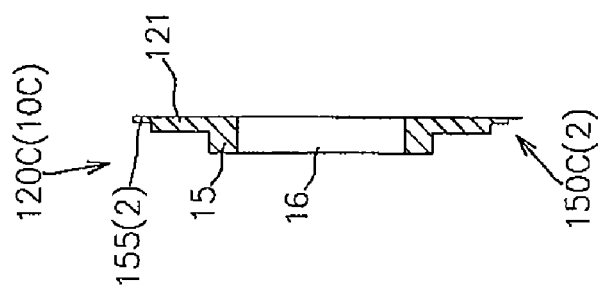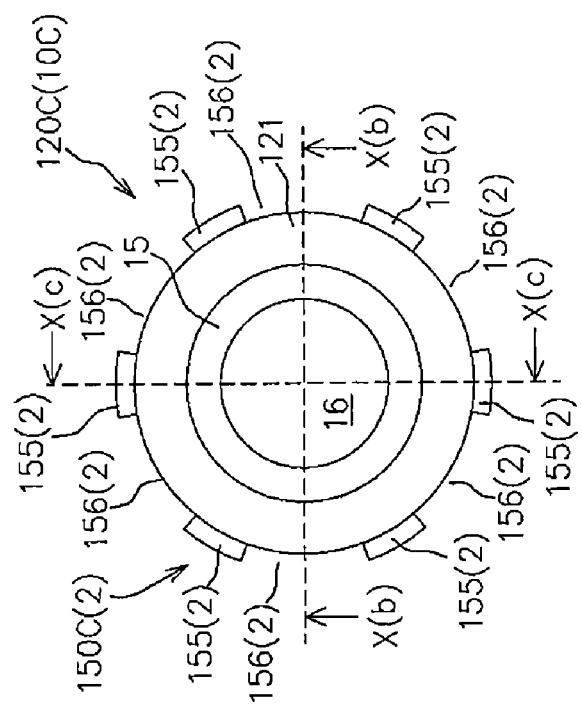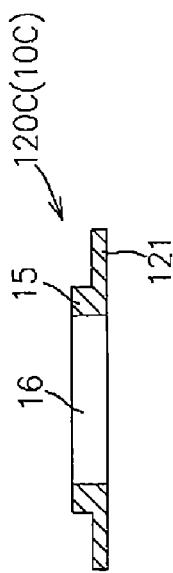

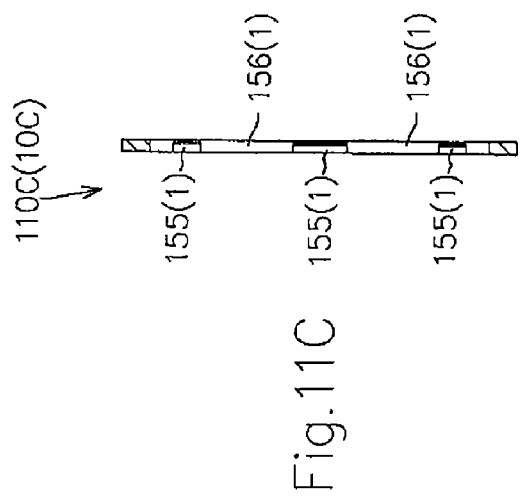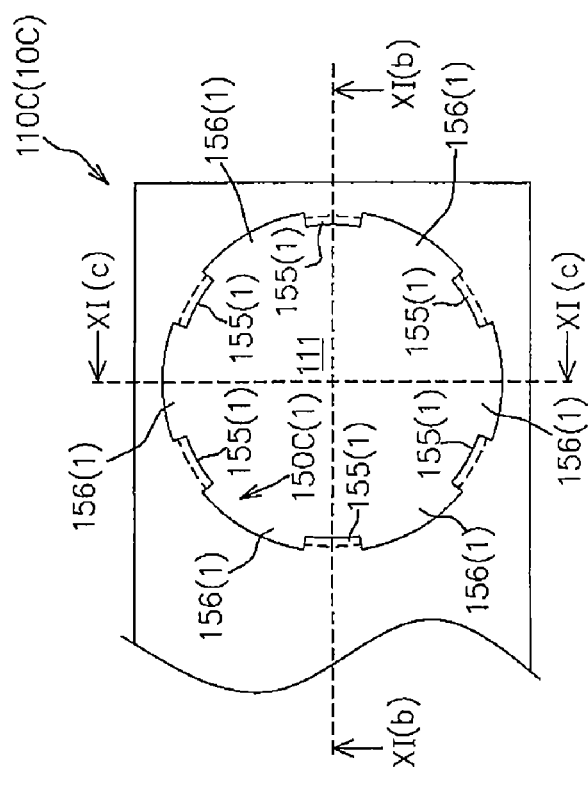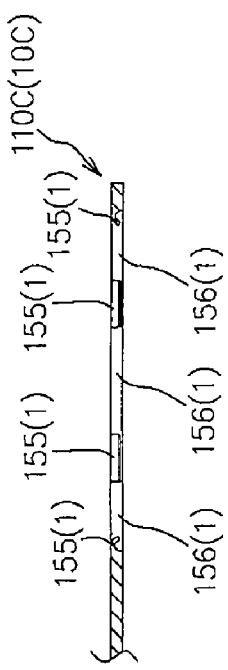
Fig.11A
Fig.11B
Fig.11C

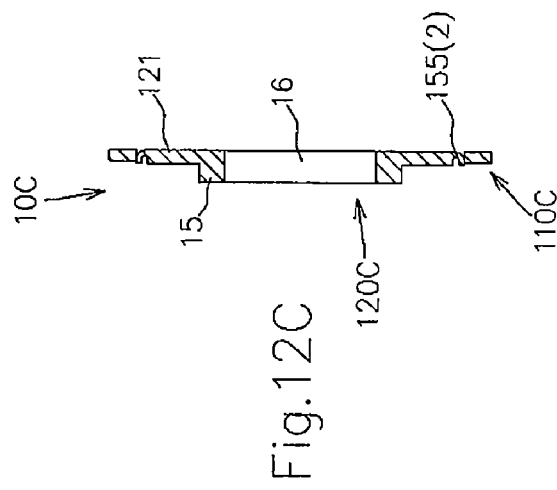
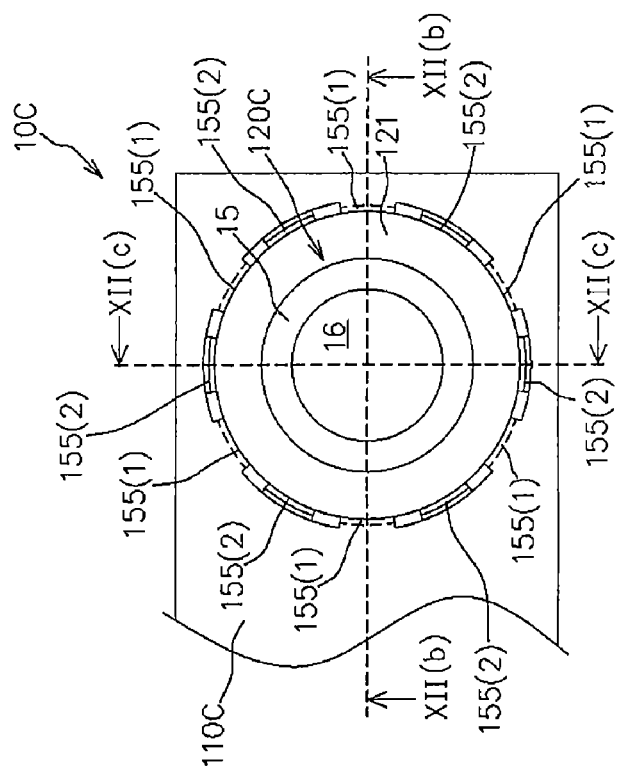
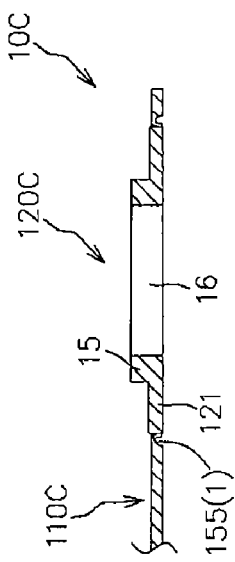
Fig.12A
Fig.12B
Fig.12C

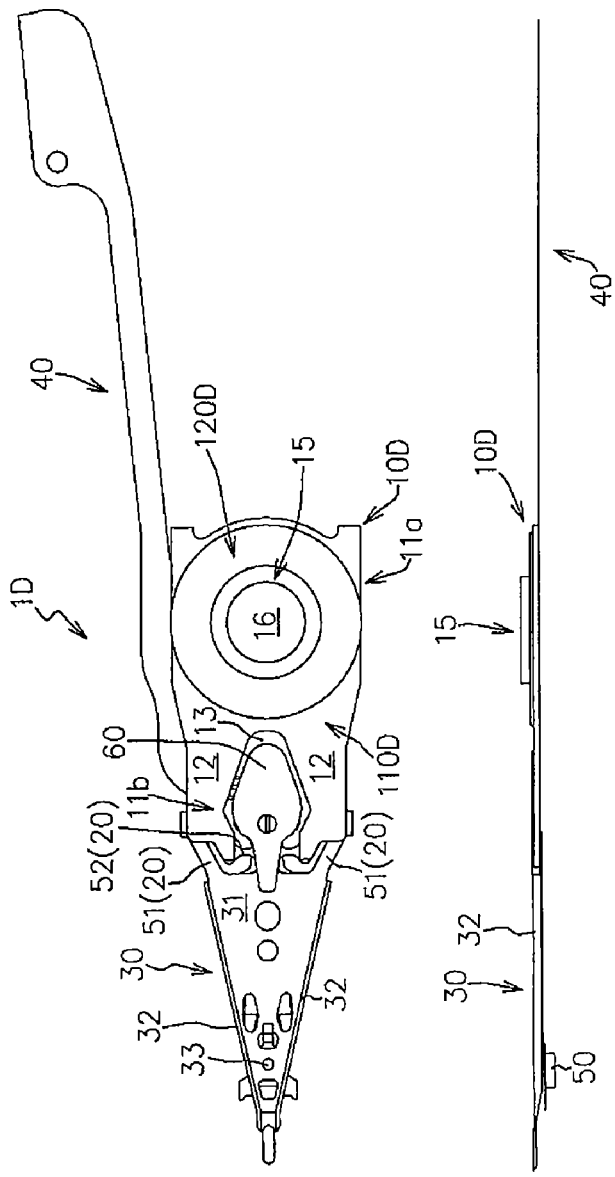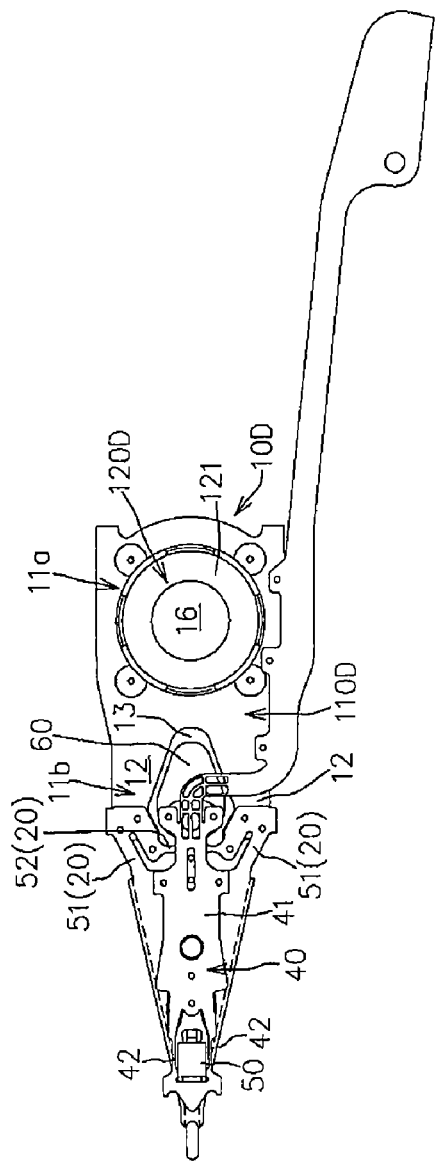
Fig.13A Fig.13B Fig.13C

SUSPENSION FOR SUPPORTING A MAGNETIC HEAD SLIDER

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

A magnetic head suspension for supporting a magnetic head slider includes a supporting part that is connected to an actuator by way of a carriage arm, a load bending part that is supported by the supporting part and that generates a load for pressing the magnetic head slider toward a disk surface, a load beam part that is supported by the supporting part via the load bending part and transmits the load to the magnetic head slider, and a flexure portion that is supported by the load beam part and that supports the magnetic head slider.

More specifically, the supporting part has a boss portion, and is supported indirectly by the actuator with the boss portion being fixed to the carriage arm by swaging.

The boss portion is formed to have a cylindrical shape by being pressed. Accordingly, in a case where the supporting part integrally includes the boss portion and a distal end section for supporting the load bending part, it is difficult to keep the distal end section flat upon formation of the boss portion. The flatness of the distal end section of the supporting part cannot be kept, particularly, in a case where the distal end section is provided with a hole or a groove in a complex shape.

For the above reasons, the supporting part generally includes a first supporting member that has a flat plate shape and has the distal end section for supporting the load bending part, and a second supporting member that has the boss portion and is provided separately from the first supporting member. The second supporting member is joined by welding to the first supporting member such that the second supporting member is laminated on the upper surface of the first supporting member.

However, such a general supporting part has the following problems: an area of the supporting part at which the boss portion is positioned has an increased thickness in a through-thickness direction (in a z direction) perpendicular to the disk and the weight of the supporting part is increased.

There has been proposed a magnetic head suspension configured to solve the problems recited above such that a base plate, which has an outer periphery in a circular shape and is provided with a boss portion in a short cylindrical shape to be fixed by swaging to a carriage arm, is fitted in a hole provided in a proximal portion of a member forming a load beam (see Japanese Patent Publication No. 3340103 (hereinafter, referred to as Patent Document 1)).

The magnetic head suspension described in Patent Document 1 is useful in that, in comparison to the general supporting part, the thickness can be reduced at the area of the supporting part at which the boss portion is positioned as well as that the weight of the supporting part can be reduced.

However, in the magnetic head suspension described in Patent Document 1, the base plate is sized to have an outer diameter that closely fits in the hole provided in the proximal portion. As a result, there arise the following problems.

In a case where the outer diameter of the base plate is smaller than the inner diameter of the hole due to variation in size, the base plate easily fits in the hole, but insufficient joint strength between the base plate and the proximal portion lowers the resonant frequency of the magnetic head suspension.

To the contrary, in a case where the outer diameter of the base plate is close to the inner diameter of the hole due to variation in size, it is difficult or impossible for the base plate to fit in the hole. If the base plate is forcibly pressed into the hole, a load is applied to the proximal portion, and thus the flatness of the proximal portion is deteriorated.

SUMMARY OF THE INVENTION

The present invention has been made in view of the above conventional art, and it is an object thereof to provide a magnetic head suspension including a supporting part having a boss portion that is fixed to a carriage arm by swaging, the carriage arm being connected to an actuator, reducing the thickness at an area at which the boss portion is located, and reducing the weight of the supporting part, as well as not lowering a resonant frequency thereof, and improvement in production efficiency.

Accordingly, the present invention provides a magnetic head suspension that includes a supporting part with a boss portion fixed by swaging to a carriage arm that is connected to an actuator, a load bending part that is supported by the supporting part and generates a load for pressing a magnetic head slider toward a disk surface, a load beam part that is supported by the supporting part through the load bending part and transmits the load to the magnetic head slider, and a flexure part that is supported by the load beam part while supporting the magnetic head slider, wherein the supporting part includes a first supporting member with which the load bending part is connected, and a second supporting member that is provided separately from the first supporting member and includes the boss portion and a main body region extending radially outward from an outer periphery of the boss portion, the first supporting member is provided with a mount hole that has a shape corresponding to the outer periphery of the main body region in the second supporting member and has a diameter larger than that of the main body region, at least one of the inner periphery of the mount hole and the outer periphery of the main body region is integrally provided with a rib region, and the first and second supporting members are connected to each other by a restoring force or reaction force of the rib region that has been elastically and/or plastically deformed by the other one of the inner periphery of the mount hole and the outer periphery of the main body region with the main body region being located at least partially in the mount hole in a through-thickness direction.

The magnetic head suspension according to the present invention may effectively prevent the thickness of an area at which the boss portion is located and the weight of the supporting part from being increased while also preventing the flatness of the first supporting member with which the load bending part is connected from deteriorating upon formation of the boss portion.

Further, the rib region achieves a stable connection of the first and second supporting members without requiring strict dimensional accuracy in the outer diameter of the main body region and the inner diameter of mount hole. Therefore, the magnetic head suspension may improve production efficiency without reducing its resonant frequency.

Preferably, the rib region is configured so as to be within a thickness range of the first supporting member in a state of being elastically and/or plastically deformed.

In one embodiment, the rib region may include a single rib that is formed so as to extend continuously and entirely along one of the inner periphery of the mount hole and the outer periphery of the main body region.

In another embodiment, the rib region may have a plurality of ribs that are circumferentially aligned with gaps each being interposed therebetween on one of the inner periphery of the mount hole and the outer periphery of the main body region.

In still another embodiment, the rib region may have a first supporting member-side rib region extending radially inward from the inner periphery of the mount hole, and a second supporting member-side rib region extending radially outward from the outer periphery of the main body region. The first supporting member-side rib region has, on the inner periphery of the mount hole, a plurality of first supporting member-side ribs that are circumferentially aligned with gaps each being interposed therebetween. The second supporting member-side rib region has, on the outer periphery of the main body region, a plurality of second supporting member-side ribs that are circumferentially aligned with gaps each being interposed therebetween. The first supporting member-side ribs and the second supporting member-side ribs are displaced from one another in a circumferential direction.

Preferably, the second supporting member may further include an extended region that extends radially outward from the main body region.

The rib region extends radially inward from the inner periphery of the mount hole in a state of having a surface that is flush with one of the upper and lower surfaces of the first supporting member.

The extended region has a surface that is flush with one of the upper and lower surfaces of the main body region, which is located on the same side as the one of the upper and lower surfaces of the first supporting member. The extended region and the first supporting member are fixed to each other in a state where the other one of the upper and lower surfaces of the extended region come into contact with the one of the upper and lower surfaces of the first supporting member.

Preferably, the supporting part may further include a third supporting member with a through hole that has a diameter larger than that of a boss hole in the boss portion and smaller than that of the mount hole.

The third supporting member is fixed to both of the first supporting member and the main body region of the second supporting member in a state where the through hole is surrounded by the mount hole while surrounding the boss hole.

BRIEF DESCRIPTION OF THE DRAWINGS

FIGS. 1A to 1C are a top view (a plan view as viewed from a side opposite from a disk surface), a side view and a bottom view (a bottom plan view as viewed from a side close to the disk surface) of a magnetic head suspension according to a first embodiment of the present invention, respectively.

FIGS. 5A and 5B are vertical cross sectional views of a first supporting member of the supporting part of the magnetic head suspension according to the first embodiment, and show states before and after a rib region provided on an inner periphery of a mount hole of the first supporting member is bent, respectively.

FIG. 7 is a vertical cross sectional view of a supporting part of a magnetic head suspension according to another modification of the present invention.

FIGS. 8A and 8B are vertical cross sectional views of first and second supporting members in the second modification, respectively, and FIG. 8C is a vertical cross sectional view of the first and second supporting members connected to each other.

FIG. 9A is a top view of a second supporting member of the supporting part, FIG. 9B is a cross sectional view taken along line IX(b)-IX(b) in FIG. 9A, FIG. 9C is a top view of a first supporting member of the supporting part.

FIG. 10A is a top view of a second supporting member of a supporting part of a magnetic head suspension according to a third embodiment of the present invention, and FIGS. 10B and 10C are cross sectional views taken along lines X(b)-X(b) and X(c)-X(c) in FIG. 10A, respectively.

FIG. 11A is a top view of a first supporting member of the supporting part in the third embodiment, and FIGS. 11B and 11C are cross sectional views taken along lines XI(b)-XI(b) and XI(c)-XI(c) in FIG. 11A, respectively.

FIG. 12A is a top view of the first and second supporting members connected with each other, and FIGS. 12B and 12C are cross sectional views taken along lines XII(b)-XII(b) and XII(c)-XII(c) in FIG. 12A, respectively.

FIGS. 13A-13C are top, side and bottom views of a magnetic head suspension according to a fourth embodiment of the present invention, respectively.

DETAILED DESCRIPTION OF THE PREFERRED EMBODIMENTS

First Embodiment

Hereinafter, one preferred embodiment of a magnetic head suspension according to the present invention will be described, with reference to the attached drawings.

FIGS. 1A to 1C are a top view (a plan view as viewed from a side opposite from a disk surface), a side view and a bottom view (a bottom plan view as viewed from a side close to the disk surface) of a magnetic head suspension 1A according to the present embodiment, respectively. FIG. 1C indicates welding points as small circles.

Figure 2:
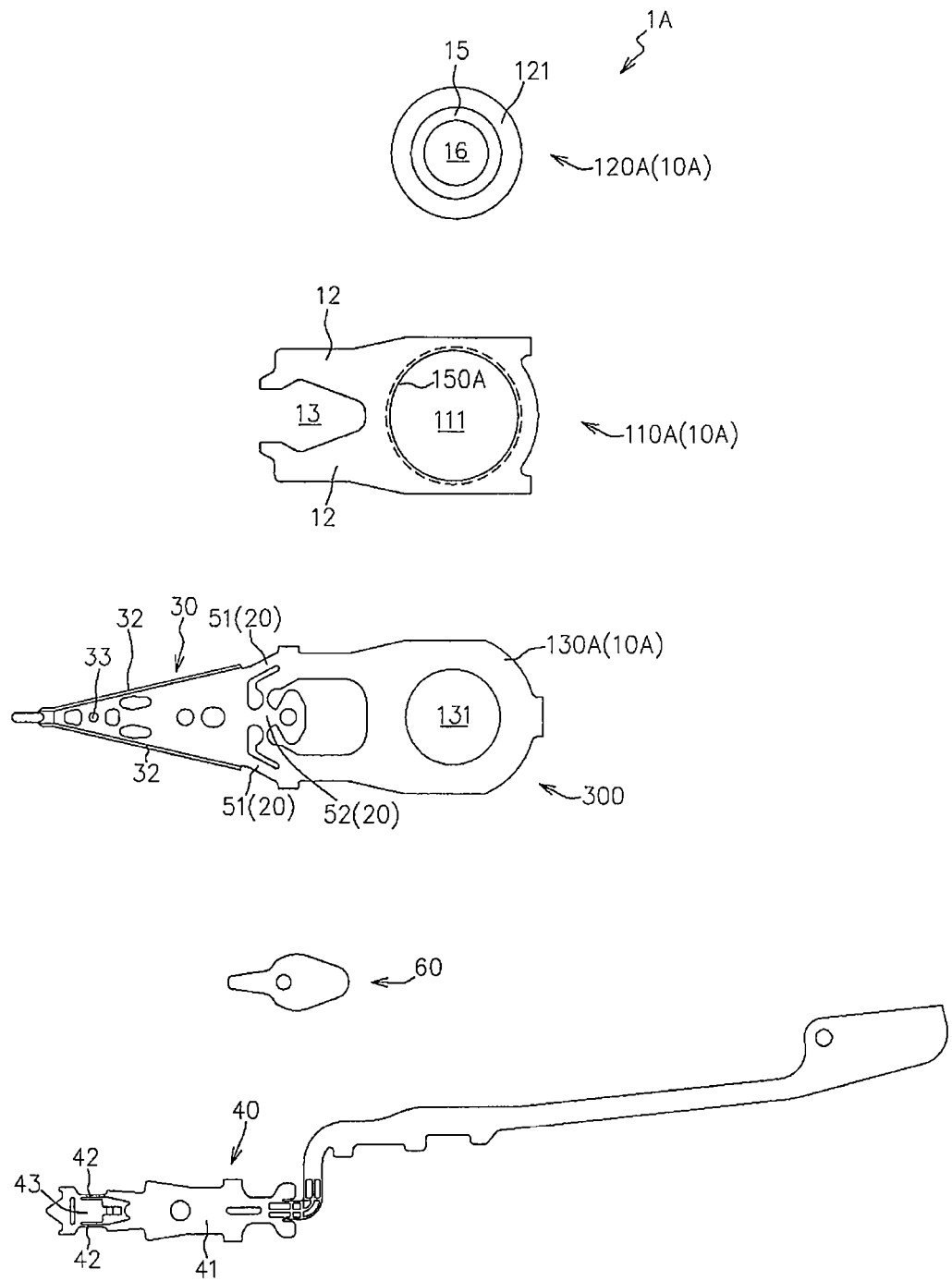
FIG. 2 is an exploded plan view of the magnetic head suspension according to the first embodiment.

FIG. 2 is an exploded plan view of the magnetic head suspension 1A.

As shown in FIGS. 1A to FIG. 1C and FIG. 2, the magnetic head suspension 1A includes a supporting part 10A that includes a boss portion 15 fixed by swaging to a carriage arm (not shown), which is connected to an actuator (not shown), a load bending part 20 that is supported by the supporting part 10A and generates a load for pressing a magnetic head slider 50 toward a disk surface, a load beam part 30 that is supported by the supporting part 10A through the load bending part 20 and that transmits the load to the magnetic head slider 100, and a flexure part 40 that is supported by the load beam part 30 and supports the magnetic head slider 50.

The supporting part 10A supports, through the load bending part 20, an assembly that includes the load beam part 30, the flexure part 40 and the magnetic head slider 50 in a state of being supported by the actuator through the carriage arm, and is therefore made to have relatively high rigidity.

The supporting part 10A includes a proximal end section 11a at which the boss portion 15 is arranged, and a distal end section 11b to which the load bending part 20 is connected.

In the present embodiment, as shown in FIG. 1A to FIG. 1C and FIG. 2, the distal end section 11b has a pair of supporting pieces 12 extending from both ends in a suspension width direction toward a distal end side of the suspension 1A so that there is formed in a center in the suspension width direction a concave region 13 which is opened to the distal end side of the suspension 1A.

More specifically, the distal end section 11b includes the pair of supporting pieces 12 extending from both ends of the proximal end section 11a in the suspension width direction toward the distal end side of the suspension 1A with the concave region 13 being defined between the pair of supporting pieces 12.

The supporting part 10A includes a first supporting member 110A that forms the distal end section 11b to which the load bending part 20 is connected, and a second supporting member 120A that is separate from the first supporting member 110A and includes the boss portion 15.

The configurations of the first and second supporting members 110A and 120A are later explained.

As described above, the load beam part 30 transmits the load generated by the load bending part 20 to the magnetic head slider 50, and therefore is required to have a predetermined rigidity.

As shown in FIG. 1A to FIG. 1C and FIG. 2, in the present embodiment, the load beam part 30 has a plate-like main body portion 130a and flange portions 35 that are formed by being bent at both sides of the main body portion 130a in the suspension width direction. The flange portions 35 secure the rigidity.

The load beam part 30 may be, for example, a stainless plate having a thickness of 0.02 mm to 0.1 mm.

The load beam part 30 is provided, at its distal end section, with a protrusion 33 that is a so-called dimple.

The protrusion 31 is protruded by, for example, about 0.05 mm to 0.1 mm, in a direction toward the disk surface. The protrusion 33 is brought into contact with an upper surface (a surface opposite from the disk surface) of a head-mounting region 43 of the flexure part 40, so that the load is transmitted to the head-mounting region 43 of the flexure part 40 through the protrusion 33.

The flexure part 40 supports the magnetic head slider 50 in a state of being connected to the load beam part 30.

Specifically, the flexure part 40 includes, as shown in FIG. 1A to FIG. 1C and FIG. 2, a body region 41 that is brought into contact with the lower surface (the surface facing the disk surface) of the load beam part 30 and connected thereto by welding or the like, and a pair of supporting pieces 42 that extends from the body region 41 toward the distal end side, and the head-mounting region 43 that is supported by the supporting pieces 42.

The head-mounting region 43 supports the magnetic head slider 50 at the lower surface that faces the disk surface.

As described above, the protrusion 33 is brought into contact with the upper surface of the head-mounting region 43, so that the head-mounting region 43 could sway flexibly in a roll direction and in a pitch direction, with the protrusion 33 functioning as a fulcrum.

The flexure part 40 has a rigidity lower than that of the load beam part 30, so that the head-mounting region 43 can sway in the roll direction and in the pitch direction.

The flexure part 40 may be preferably formed by, for example, a stainless plate having a thickness of 0.01 mm to 0.025 mm.

The flexure part 40 may be further provided integrally with a wiring in form of a printed circuit that transmits a writing signal and/or a reading signal to/from the magnetic head slider 50.

As shown in FIG. 1A to FIG. 1C and FIG. 2, the magnetic head suspension 1A further includes an equilibrating weight part 60 that is connected to the load beam part 30 so as to have a proximal end located within the concave region 13 in a plan view.

The equilibrating weight part 60 forms the assembly together with the load beam part 30, the flexure part 40 and the magnetic head slider 50, the assembly being supported by the supporting part 10A through the load bending part 20.

The equilibrating weight part 60 may be preferably formed of a stainless plate having a thickness of 0.05 mm to 0.4 mm.

The equilibrating weight part 60 makes it possible to equilibrate the weight of a portion on the distal end side and the weight of a portion on the proximal end side, with the load bending part 20 as a reference, of the assembly that is supported by the supporting part 10A through the load bending part 20, thereby improving impact resistance of the magnetic head suspension 1A.

In the present embodiment, the equilibrating weight part 60 is provided separately from a load beam part component 300 (see FIG. 2) that forms the load beam part 30, and is connected by welding to the load beam part component 300. Alternatively, the equilibrating weight part 60 may be formed integrally with the load beam part 30.

More specifically, the load beam part component 300 forming the load beam part 30 may have a central portion in the suspension width direction that is extended beyond the load bending part 20 toward the proximal end side in a suspension lengthwise direction so as to be located in the concave region 13, and the extended central portion may be configured so as to function as the equilibrating weight part 60.

In a state where the magnetic head suspension 1A is in an operating condition in which the magnetic head slider 50 is positioned above the disk surface that is being rotated, the load bending part 20 is elastically deformed in accordance with a movement of the magnetic head slider that is floated above the disk surface by air pressure due to rotation of the disk so that the load beam part 20 generates the load that presses the magnetic head slider 50 against the disk surface.

In the present embodiment, as shown in FIGS. 1A to 1C and FIG. 2, the load bending part 20 includes paired first elastic plate portions 51 and a second elastic plate portion 52.

The paired first elastic plate portions 51 are disposed symmetrically with each other with respect to a longitudinal center line of the magnetic head suspension 1A.

The paired first elastic plate portions 51 have proximal ends connected to both sides in the suspension width direction of the distal end section 11b (the paired supporting pieces 12 in the present embodiment) of the supporting part 10A and free ends connected to the assembly in a state of being disposed to have a plate surface thereof substantially parallel to the disk surface. The first elastic plate portions 51 are elastically deformed in such a manner as that the free ends thereof are bent so as to be spaced apart from the disk surface in accordance with floating movement of the magnetic head slider 50 in a direction away from the disk surface, so that the first elastic plate portions 51 generate a first pressing load against an air pressure caused by rotation of the disk.

Each of the paired first elastic plate portions 51 are preferably made of a stainless steel plate of 0.02 mm to 0.1 mm thick, for example.

As shown in FIGS. 1A to 1C and FIG. 2, the second elastic plate portion 52 is disposed to be symmetrical with each other with respect to the longitudinal center line as well as to have a longitudinal direction thereof along the suspension width direction of the magnetic head suspension in a state of being positioned between the paired first elastic plate portions 51.

More specifically, the second elastic plate portion 52 has two ends being in its longitudinal direction that are connected respectively to both sides in the suspension width direction of the distal end sections 11b (the paired support pieces 12 in the present embodiment) of the supporting part 10A, and a center portion in its longitudinal direction that is connected to the assembly. The second elastic plate portion 52 is elastically deformed by being twisted about a twist center line along the suspension width direction in accordance with the floating behavior of the magnetic head slider 50 away from the disk surface, so that the second elastic plate portion 52 generates a second pressing load against the air pressure caused by rotation of the disk.

The second elastic plate portion 52 is preferably made of a stainless steel plate of 0.02 mm to 0.1 mm thick, for example.

In the present embodiment, as shown in FIG. 2, the paired first elastic plate portions 51 and the second elastic plate portion 52 are integrally formed by the load beam part component 300.

As described above, the load bending part 20 includes the paired first elastic plate portions 51 that are elastically deformed so as to be bent to generate the first pressing loads, and includes the second elastic plate portion 52 that is located between the paired first elastic plate portions 51 in the suspension width direction and is elastically deformed so as to be twisted to generate the second pressing load. Therefore, it is possible to raise the resonant frequency and to improve impact resistance of the magnetic head suspension 1A at the same time.

The first and second supporting members 110A and 110B are now explained.

Figures 3A, 3B:
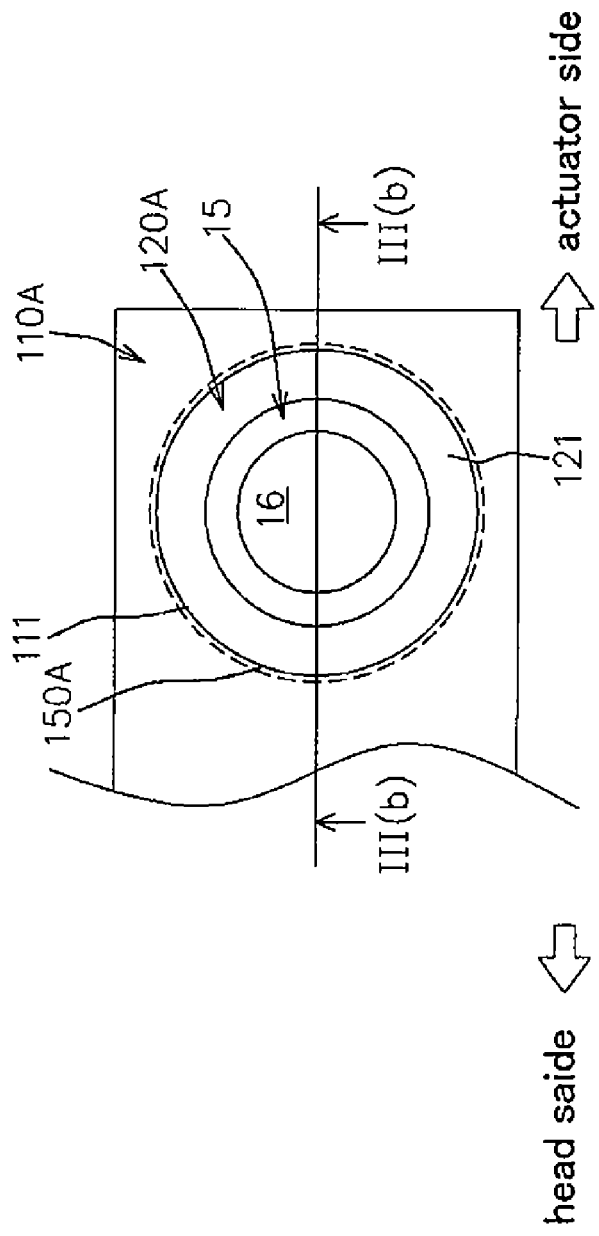
FIG. 3A is a top view of a supporting part of the magnetic head suspension according to the first embodiment.
FIG. 3B is a cross sectional view taken along line III(b)-III(b) in FIG. 3A.

FIG. 3A is a top view of the supporting part 10A, and FIG. 3B is a cross sectional view taken along line III(b)-III(b) in FIG. 3A.

As shown in FIGS. 2, 3A, and 3B, the second supporting member 120A provided separately from the first supporting member 110A includes the boss portion 15 that is provided with a boss hole 16, and a main body region 121 that extends radially outward from the outer periphery of the boss portion 15.

On the other hand, the first supporting member 110A having the distal end section 11b to which the load bending part 20 is connected is provided with a mount hole 111 that conforms to the outer periphery of the main body region 121 in the second supporting member 120A and has a diameter larger than that of the main body region 121.

As the second supporting member 120A provided with the boss portion 15 is connected to the carriage arm by swaging, the second supporting member 120A is made of a material having an elongation degree at the fracture limit higher than that of the first supporting member 110A.

For example, the first supporting member 110A can be made of SUS304-HTA (material having an elongation rate of several %) of approximately 0.1 to 0.3 mm thick, and the second supporting member 120A can be made of SUS304 (material having an elongation rate of several tens of %) of approximately 0.1 to 0.3 mm thick.

There is integrally provided a radially extending rib region 150A on at least one of the inner periphery of the mount hole 111 and the outer periphery of the main body region 121 (the inner periphery of the mount hole 111 in the present embodiment).

As shown in FIG. 3B, the first supporting member 110A and the second supporting member 120A are connected to each other due to a restoring force or reaction force of the rib region 150A that is elastically deformed and/or plastically deformed by the other one of the inner periphery of the mount hole 111 and the outer periphery of the main body region 121 (the outer periphery of the main body region 121 in the present embodiment) with the main body region 121 being located at least partially in the mount hole 111 in the through-thickness direction.

More specifically, in the present embodiment, when the main body region 121 of the second supporting member 120A is inserted into the mount hole 111 of the first supporting member 110A such that the main body region 121 is surrounded at least partially by the mount hole 111, the rib region 150A that is provided in at least one of the inner periphery of the mount hole 111 and the outer periphery of the main body region 121 is elastically deformed and/or plastically deformed by the other one of the inner periphery of the mount hole 111 and the outer periphery of the main body region 121 that is not provided with the rib region 150A, so as to retain a restoring force.

This restoring force of the rib region 150A serves as a force for connecting the first supporting member 110A and the second supporting member 120A.

The restoring force means retention elasticity of the rib region 150A. More specifically, in a case where the rib region 150A is substantially only elastically deformed, the elasticity retained by such elastic deformation serves as the restoring force. On the other hand, in a case where the rib region 150A is plastically deformed, the elasticity remaining in the rib region 150A serves as the restoring force.

As shown in FIGS. 2, 3A and 3B, in the present embodiment, the rib region 150A includes a single rib that is formed continuously and entirely along one of the inner periphery of the mount hole 111 and the outer periphery of the main body region 121 (the inner periphery of the mount hole 111 in the present embodiment).

The magnetic head suspension 1A thus configured prevents deterioration of the flatness of the distal end section 11b with which the load bending part 20 is connected, reduces thickness of the plate at the area in which the boss portion 15 is located, and reduces the weight of the supporting part 10A. Moreover, the magnetic head suspension 1A has an improved production efficiency without lowering of the resonant frequency thereof.

More specifically, the boss portion 15 is formed by pressing. Accordingly, in one conventional supporting part in which the proximal end section 11a inclusive of the boss portion 15 is formed integrally with the distal end section 11b for supporting the load bending part 20, it is difficult to keep the flatness of the distal end section 11b upon formation of the boss portion 15. Particularly in the case where a hole or a groove in a complex shape is provided at the distal end section of the supporting part 10A, the flatness cannot be kept.

On the other hand, in another conventional supporting part including a flat first supporting member that is provided with the distal end section 11b for supporting the load bending part 20, and a second supporting member that has the boss portion 15 and is provided separately from the first supporting member and is joined together by welding while being laminated on the upper surface of the first supporting member, the above problem of difficulty in keeping the flatness of the distal end section 11b upon formation of the boss portion 15 does not occur. However, at the area of the supporting part at which the boss portion 15 is positioned, the thickness in the through-thickness direction (in the z direction) perpendicular to the disk surface is increased, and the weight of the supporting part is increased.

To the contrary, in the present embodiment, as described above, the main body region 121 of the second supporting member 120A provided with the boss portion 15 is located at least partially in the mount hole 111 of the first supporting member 110A that is provided with the distal end section 11b with which the load bending part 20 is connected.

Therefore, it is possible to prevent deterioration in flatness of the distal end section 11b by formation of the boss portion 15, as well as to effectively prevent an increase in thickness of the plate at the location of the boss portion 15 and an increase in weight of the supporting part 10A.

Furthermore, in the present embodiment, as described above, when the main body region 121 of the second supporting member 120A is located at least partially in the mount hole 111 of the first supporting member 110A, the rib region 150A that is provided in at least one of the inner periphery of the mount hole 111 and the outer periphery of the main body region 121 is elastically deformed and/or plastically deformed by the other one of the inner periphery of the mount hole 111 and the outer periphery of the main body region 121 that is not provided with the rib region 150A. In other words, the rib region 150A serves as a guide for guiding the main body region 121 into the mount hole 111.

In the state where the main body region 121 is located at least partially in the mount hole 111, the rib region 150A retains a restoring force by being elastically deformed and/or plastically deformed. This restoring force connects the first supporting member 110A and the second supporting member 120A with each other.

It is therefore possible to reliably connect the first supporting member 110A and the second supporting member 120A with each other without precisely matching the sizes of the outer diameter of the main body region 121 and the inner diameter of the mount hole 111. As a result, production efficiency of the magnetic head suspension 1A can be improved without lowering the resonant frequency thereof.

In the present embodiment, the rib region 150A extends radially inward from the inner periphery of the mount hole 111 in a state of having an upper surface that is flush with the upper surface (the surface not facing the disk) of the first supporting member 110A. However, the present invention is not limited to such a configuration.

Figure 4A:
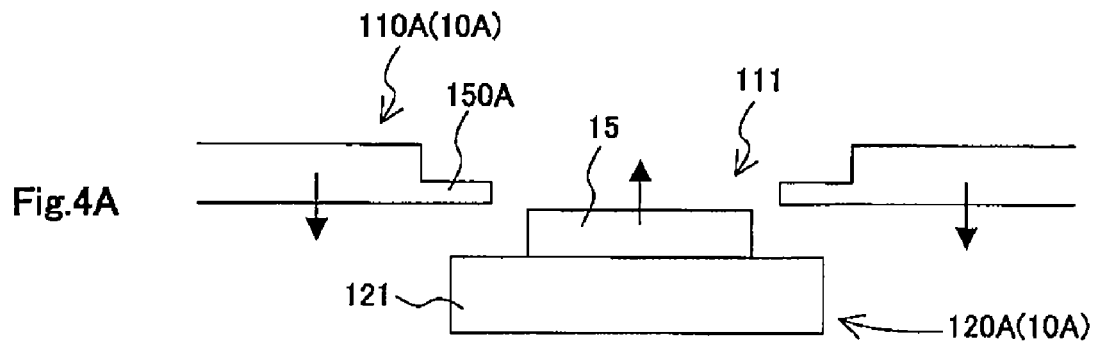
FIGS. 4A to 4C are schematic side views of supporting parts in first to third modifications of the present invention, respectively.

Alternatively, as in a first modification shown in FIG. 4A, the rib region 150A can be formed, for example, to extend radially inward from the inner periphery of the mount hole 111 so as to have a lower surface that is flush with the lower surface (the surface facing the disk) of the first supporting member 110A.

As in the present embodiment and in the first modification, the rib region 150A provided on the inner peripheral surface of the mount hole 111 can be easily formed by etching one of the sides (namely, one of the lower and upper surfaces) of the first supporting member 110A.

Alternatively, the rib region 150A can be formed on the outer periphery of the main body region 121 instead of the inner periphery of the mount hole 111.

Figure 4B:
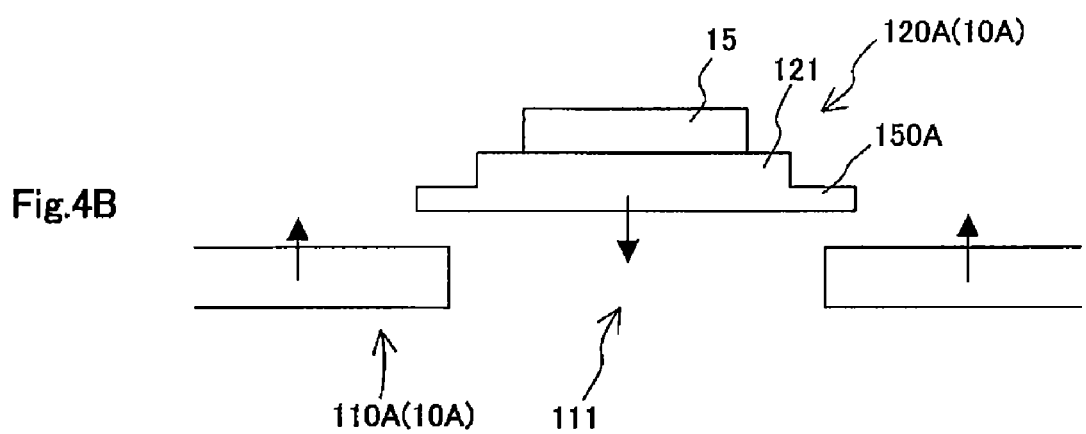

More specifically, as in a second modification shown in FIG. 4B, the rib region 150A can be formed to extend radially outward from the outer periphery of the main body region 121 so as to have a lower surface that is flush with the lower surface (the surface facing the disk) of the second supporting member 120A. Alternatively, the rib region 150A can be formed to extend radially outward from the outer periphery of the main body region 121 so as to have an upper surface that is flush with the upper surface (the surface not facing the disk) of the second supporting member 120A.

The rib region 150A provided on the outer periphery of the main body region 121 can be easily formed by pressing.

In the present embodiment and in the second modification, in order to connect the first supporting member 110A and the second supporting member 120A with each other, the first supporting member 110A and the second supporting member 120A are relatively shifted so that the main body region 121 is inserted into the mount hole 111 from the state the second supporting member 120A is located on a side of the upper surface (a side that is opposite from the disk) of the first supporting member 110A.

More specifically, the second supporting member 120A is firstly located on a side of the upper surface of the first supporting member 110A, and then the first supporting member 110A is pushed in a direction apart from the disk and/or the second supporting member 120A is pushed in a direction toward the disk, so that the first supporting member 110A and the second supporting member 120A are connected with each other.

To the contrary, in the first and third modifications, in order to connect the first supporting member 110A and the second supporting member 120A with each other, the first supporting member 110A and the second supporting member 120A are relatively shifted so that the main body region 121 is inserted in the mount hole 111 from the state where the second supporting member 120A is located on a side of the lower surface (a side closer to the disk) of the first supporting member 110A.

More specifically, the second supporting member 120A is firstly located on a side of the lower surface of the first supporting member 110A, and then the first supporting member 110A is pushed in a direction toward the disk and/or the second supporting member 120A is pushed in a direction away from the disk, so that the first supporting member 110A and the second supporting member 120A are connected with each other.

Prior to connecting the first supporting member 110A and the second supporting member 120A, the free end of the rib region 150A can be preferably bent in such a direction so that the supporting member not provided with the rib region 150A is shifted relatively toward the supporting member provided with the rib region 150A.

In the present embodiment, as described above, the rib region 150A is provided at the mount hole 111 in the first supporting member 110A. Also, upon connecting the first supporting member 110A and the second supporting member 120A, the second supporting member 120A not provided with the rib region 150A is shifted in a direction toward the disk relatively to the first supporting member 110A provided with the rib region 150A.

Therefore, the free end of the rib region 150A is preliminarily bent so that the free end is closer to the disk.

FIGS. 5A and 5B are vertical cross sectional views of the first supporting member 110A in the states before and after bending the rib region 150A, respectively.

Figure 6A:
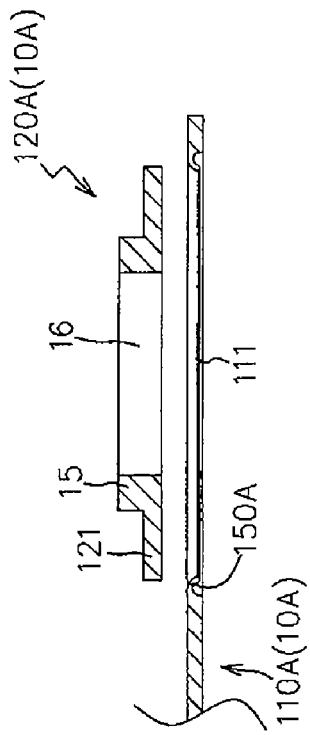
FIGS. 6A to 6C are vertical cross sectional views showing processes of connecting the first and second supporting members of the supporting part of the magnetic head suspension according to the first embodiment, and show states before, during, and after the first and second supporting members are connected, respectively.
Figure 6B:
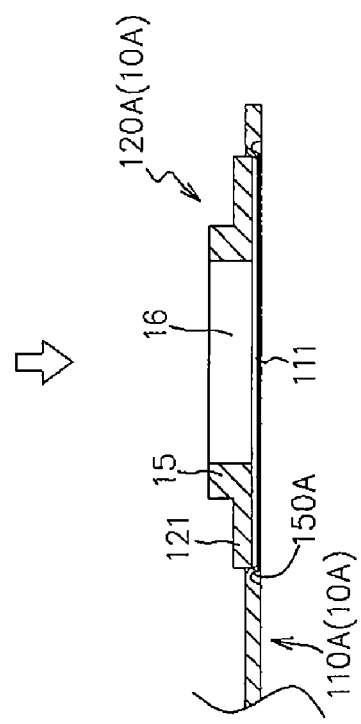
Figure 6C:
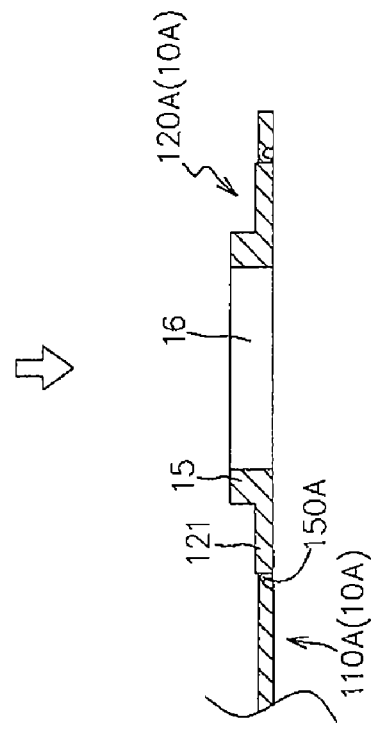

FIGS. 6A to 6C are vertical cross sectional views of the first supporting member 110A and the second supporting member 120A in the states before, during, and after connecting the first supporting member 110A and the second supporting member 120A, respectively.

As shown in FIGS. 6A to 6C, in this preferable configuration, the main body region 121 of the second supporting member 120A can be smoothly inserted into the mount hole 111 of the first supporting member 110A. As a result, it is possible to further facilitate connecting the first supporting member 110A and the second supporting member 120A, as well as to improve accuracy in positioning the first supporting member 110A and the second supporting member 120A.

In the first modification shown in FIG. 4A, upon connecting the first supporting member 110A and the second supporting member 120A, the second supporting member 120A not provided with the rib region 150A is shifted in a direction apart from the disk relatively to the first supporting member 110A provided with the rib region 150A. Accordingly, it is preferable that the rib region 150A is preliminarily bent so that the free end is spaced away from the disk.

In the second modification shown in FIG. 4B, upon connecting the first supporting member 110A and the second supporting member 120A, the first supporting member 110A not provided with the rib region 150A is shifted in a direction away from the disk relatively to the second supporting member 120A provided with the rib region 150A. Accordingly, it is preferable that the rib region 150A is preliminarily bent so that the free end is spaced away from the disk.

Figure 4C:
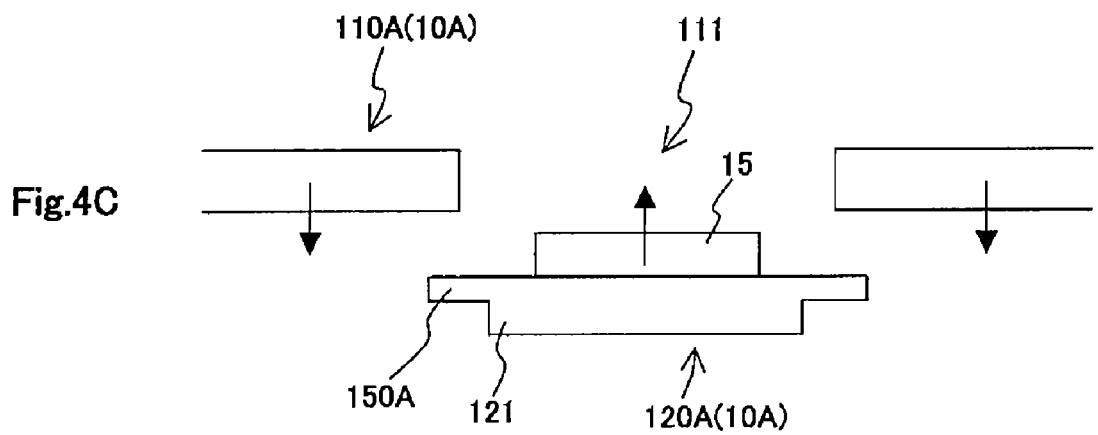

In the third modification shown in FIG. 4C, upon connecting the first supporting member 110A and the second supporting member 120A, the first supporting member 110A not provided with the rib region 150A is shifted in a direction toward the disk relatively to the second supporting member 120A provided with the rib region 150A. Accordingly, it is preferable that the rib region 150A is preliminarily bent so that the free end is closer to the disk.

More preferably, as shown in FIGS. 3B and 6C, the rib region 150A is configured to be located within the range of the thickness of the plate of the first supporting member 110A in a state where it has been elastically deformed and/or plastically deformed by connecting the first supporting member 110A and the second supporting member 120A.

In other words, in order to elastically deform and/or plastically deform the rib region 150A upon connecting the first supporting member 110A and the second supporting member 120A, the rib region 150A needs to be overlapped with the supporting member not provided with the rib region 150A in a plan view as viewed along the direction perpendicular to the disk surface in the state before connecting the first supporting member 110A and the second supporting member 120A.

More specifically, in the case where the rib region 150A is provided on the inner periphery of the mount hole 111 as in the present embodiment and in the first modification shown in FIG. 4A, in order to elastically deform and/or plastically deform the rib region 150A upon connecting the first supporting member 110A and the second supporting member 120A, the inner diameter defined by the free end of the rib region 150A needs to be smaller than the outer diameter of the main body region 121 so that the rib region 150A is overlapped with the main body region 121 of the second supporting member 120A.

On the other hand, in the case where the rib region 150A is provided on the outer periphery of the main body region 121 as in the second and third modifications shown respectively in FIGS. 4B and 4C, in order to elastically deform and/or plastically deform the rib region 150A upon connecting the first supporting member 110A and the second supporting member 120A, the outer diameter defined by the free end of the rib region 150A needs to be larger than the inner diameter of the mount hole 111 so that the rib region 150A is overlapped with the first supporting member 110A.

However, if the rib region 150A is overlapped too much with the first supporting member 110A or with the second supporting member 120A, the rib region 150A projects outward from a space defined by the thickness of the plate of the first supporting member 110A in a state where it has been elastically deformed and/or plastically deformed.

Accordingly, the radial length of the rib region 150A can be preferably determined such that, in the state before connecting the first supporting member 110A and the second supporting member 120A, the rib region 150A is overlapped in the plan view with the first supporting member 110A or the second supporting member 120A not provided with the rib region 150A, as well as such that, in the state after the rib region 150A has been elastically deformed and/or plastically deformed, it does not protrude outward from the upper or lower surface of the first supporting member 110A.

In the case where the rib region 150A is provided on the outer periphery of the main body region 121 as in the second and third modifications shown respectively in FIGS. 4B and 4C, there can be provided a tapered portion (not shown) on one of the surfaces (the upper and lower surfaces of the first supporting member 110A in the second and third modifications, respectively) of the first supporting member 110A from which the main body region 121 is inserted into the mount hole 111 so as to be led to the mount hole 111. Such an arrangement further facilitates connecting the first supporting member 110A and the second supporting member 120A as well as improves accuracy in positioning the first supporting member 110A and the second supporting member 120A.

Moreover, as shown in FIG. 7, after the rib region 150A has been elastically deformed and/or plastically deformed so that the first supporting member 110A and the second supporting member 120A are connected with each other, the vicinity of the rib region 150A can be covered with an adhesive agent 190, such as an epoxy resin, which has a small modulus of longitudinal elasticity.

This arrangement effectively prevents impurities such as dust from entering a concave portion formed in the vicinity of the rib region 150A.

FIGS. 8A and 8B are vertical cross sectional views of the first supporting member 110A and the second supporting member 120A, respectively, according to the second modification.

Further, FIG. 8C is a vertical cross sectional view of the first supporting member 110A and the second supporting member 120A after having been connected with each other in the second modification.

As described earlier, the second supporting member 120A provided with the boss portion 15 is made of a material having an elongation degree at the fracture limit higher than that of the first supporting member 110A.

Thus, as in the second modification shown in FIG. 4B and FIGS. 8A to 8C and as in the third modification shown in FIG. 4C, in the case where the rib region 150A is provided on the outer periphery of the main body region 121, the rib region 150A having been elastically deformed and/or plastically deformed can be intimately attached to the outer periphery of the main body region 121 (see FIG. 8C).

This configuration prevents or reduces formation of a concave portion in the vicinity of the rib region 150A.

In the second and third modifications, the rib region 150A, in a state of having been elastically deformed and/or plastically deformed upon connecting the first supporting member 110A and the second supporting member 120A, can have a length larger than the thickness of the first supporting member 110A as far as being not larger than the thickness of the main body region 121 (see FIG. 8C).

As shown in FIGS. 1C and 2, in the magnetic head suspension 1A according to the present embodiment, the supporting part 10A is provided with a third supporting member 130A, in addition to the first supporting member 110A and the second supporting member 120A.

The third supporting member 130A is provided with a through hole 131 that has a diameter larger than that of the boss hole 16 in the boss portion 15 as well as smaller than that of the mount hole 111.

The third supporting member 130A is fixed by welding or the like to both of the first supporting member 110A and the main body region 121 of the second supporting member 120A with the through hole 131 being surrounded by the mount hole 111 while surrounding the boss hole 16.

Provision of the third supporting member 130A thus configured realizes a more rigid connection between the first supporting member 110A and the second supporting member 120A.

As shown in FIG. 2, in the present embodiment, the third supporting member 130A is formed integrally with the load beam part component 300. Alternatively, it is of course possible to provide the third supporting member 130A separately from the load beam part component 300.

As shown in FIG. 1C, in the present embodiment, the third supporting member 130A is joined to the lower surfaces (the surfaces facing the disk) of the first supporting member 110A and the main body region 121 of the second supporting member 120A. Alternatively, the third supporting member 130A can be joined to the upper surfaces (the surfaces not facing the disk) of the first supporting member 110A and the main body region 121 of the second supporting member 120A.

Second Embodiment

Hereinafter, another embodiment of the magnetic head suspension according to the present invention will be described, with reference to the attached drawings.

Figure 9A:
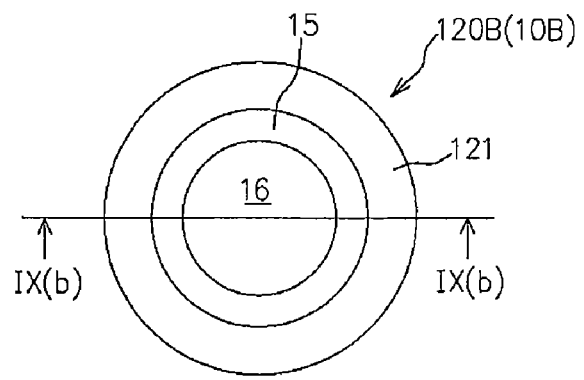
FIGS. 9A to 9C are views showing a supporting part of a magnetic head suspension according to a second embodiment of the present invention.
Figure 9B:
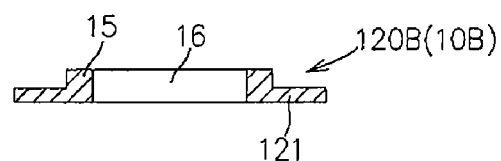

FIG. 9A is a top view of a second supporting member 120B in a magnetic head suspension according to the present embodiment, and FIG. 9B is a cross sectional view taken along line IX(b)-IX(b) in FIG. 9A.

Figure 9C:
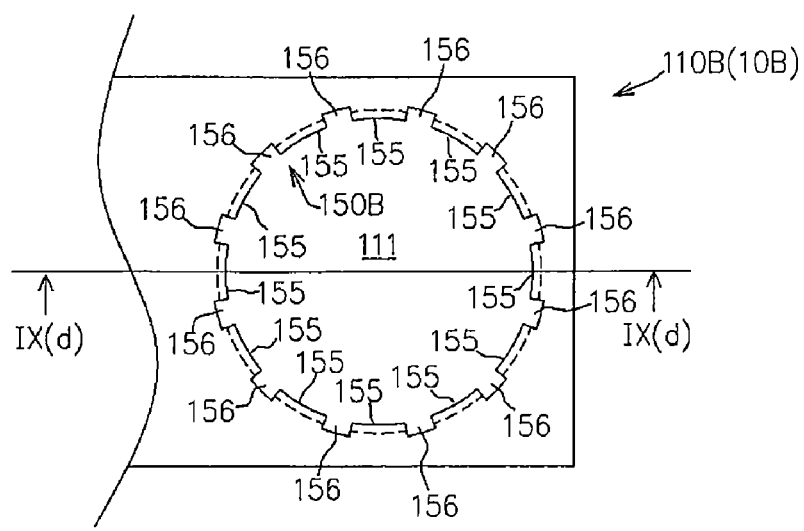
Figure 9D:
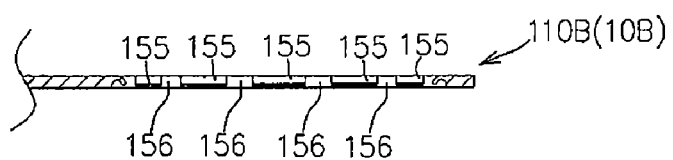
FIG. 9D is a cross sectional view taken along line IX(d)-IX(d) in FIG. 9C.

FIG. 9C is a top view of a first supporting member 110B in the magnetic head suspension according to the present embodiment, and FIG. 9D is a cross sectional view taken along line IX(d)-IX(d) in FIG. 9C.

Figure 9E:
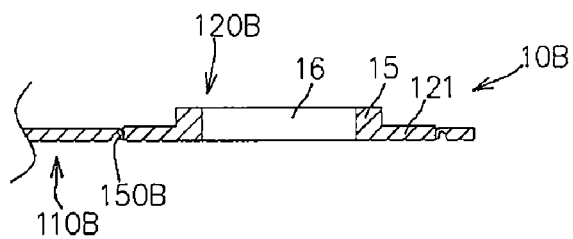
FIG. 9E is a vertical cross sectional view of the first and second supporting members connected with each other.

FIG. 9E is a vertical cross sectional view of the first and second supporting members 110B and 120B connected with each other.

In the figures, the members same as those in the first embodiment are denoted by the same reference numerals to omit the detailed description thereof.

The magnetic head suspension according to the present embodiment is different from the magnetic head suspension 1A according to the first embodiment in that the supporting part 10A is replaced by a supporting part 10B.

More specifically, in the supporting part 10A in the first embodiment, the rib region 150A has a single rib that is formed continuously and entirely along one of the inner periphery of the mount hole 111 and the outer periphery of the main body region 121.

To the contrary, as shown in FIGS. 9C and 9D, in the supporting part 10B in the present embodiment, the rib region 150B has a plurality of ribs 155 circumferentially aligned with gaps 156 each being interposed therebetween on one of the inner periphery of the mount hole 111 and the outer periphery of the main body region 121 (the inner periphery of the mount hole 111 in the present embodiment).

The magnetic head suspension with the supporting part 10B according to the present embodiment makes it possible to avoid cracks at the rib region 150B at the time when the rib region 150B is elastically deformed and/or plastically deformed upon connection of the first and second supporting members 110B and 120B, thereby achieving stable connection of the first and second supporting members 110B and 120B.

In the present embodiment, the rib region 150B with the plurality of ribs 155 is provided on the inner periphery of the mount hole 111 in the first supporting member 110B. Alternatively, the rib region 150B having the plurality of ribs 155 that are circumferentially arranged with the gaps 156 each being interposed therebetween could be provided on the outer periphery of the main body region 121 of the second supporting member 120B.

Third Embodiment

Hereinafter, still another embodiment of the magnetic head suspension according to the present invention will be described, with reference to the attached drawings.

FIG. 10A is a top view of a second supporting member 120C in a magnetic head suspension according to the present embodiment, and FIGS. 10B and 10C are cross sectional views taken along lines X(b)-X(b) and X(c)-X(c) in FIG. 10A, respectively.

FIG. 11A is a top view of a first supporting member 110C in a magnetic head suspension according to the present embodiment, and FIGS. 11B and 11C are cross sectional views taken along lines XI(b)-XI(b) and XI(c)-XI(c) in FIG. 11A, respectively.

FIG. 12A is a top view of the first and second supporting members 110C and 120C connected with each other, and FIGS. 12B and 12C are cross sectional views taken along lines XII(b)-XII(b) and XII(c)-XII(c) in FIG. 12A, respectively.

In the figures, the members same as those in the first and second embodiments are denoted by the same reference numerals to omit the detailed description thereof.

The magnetic head suspension according to the present embodiment is different from the magnetic head suspensions according to the first and second embodiments in that the supporting part 10A is replaced by a supporting part 10C.

As shown in FIGS. 10A-10C, FIGS. 11A-11C and FIGS. 12A-12C, the supporting part 10C includes the first supporting member 110C with which the load bending part 20 is connected, and the second supporting member 120C that is formed separately from the first supporting member 110C and includes the boss portion 15.

The supporting part 10C has a first supporting member-side rib region 150C(1) extending radially inward from the inner periphery of the mount hole 111, and a second supporting member-side rib region 150C(2) extending radially outward from the outer periphery of the main body region 121.

More specifically, in the supporting part 10C, the first and second supporting member-side rib regions 150C(1) and 150C(2) are provided on the inner periphery of the mount hole 111 and the outer periphery of the main body region 121, respectively.

As shown in FIGS. 11A to 11C, the first supporting member-side rib region 150C(1) has, on the inner periphery of the mount hole 111, a plurality of first supporting member-side ribs 155(1) that are circumferentially aligned with gaps 156(1) each being interposed therebetween.

As shown in FIGS. 10A to 10C, the second supporting member-side rib region 150C(2) has, on the outer periphery of the main body region 121, a plurality of second supporting member-side ribs 155(2) that are circumferentially aligned with gaps 156(2) each being interposed therebetween.

As shown in FIGS. 10A to 10C, 11A to 11C, and 12A to 12C, the first supporting member-side ribs 155(1) and the second supporting member-side ribs 155(2) are displaced from one another in a circumferential direction.

More specifically, the first supporting member-side ribs 155(1) are located at the same position in the circumferential direction as the gaps 156(2) that are each provided between the adjacent second supporting member-side ribs 155(2). Also, the second supporting member-side ribs 155(2) are located at the same position in the circumferential direction as the gaps 156(1) that are each provided between the adjacent first supporting member-side ribs 155(1).

The thus configured magnetic head suspension makes it possible to have the first and second supporting members 110C and 120C more stably connected with each other than the magnetic head suspension according to the second embodiment.

The vertical positions (in the z direction) of the first supporting member-side rib region 150C(1) and the second supporting member-side rib region 150C(2) are determined in accordance with the direction of relative shifting of the first supporting member 110C and the second supporting member 120C upon connecting therebetween.

More specifically, in the present embodiment, as shown in FIGS. 11A to 11C, the first supporting member-side rib region 150C(1) is located at such a vertical position as to have an upper surface that is in a plane identical with the upper surface (the surface not facing the disk) of the first supporting member 110C.

In such a case, upon connecting the first supporting member 110C and the second supporting member 120C, the first supporting member 110C and the second supporting member 120C are relatively shifted such that the main body region 121 of the second supporting member 120C is inserted into the mount hole 111 from a side of the upper surface (the surface not facing the disk) of the first supporting member 110C.

Therefore, as shown in FIGS. 10A to 10C, the second supporting member-side rib region 150C(2) is located at such a vertical position as to have a lower surface that is in a plane identical with the lower surface (the surface facing the disk) of the second supporting member 120C, such that the second supporting member-side rib region 150C(2) can be elastically deformed and/or plastically deformed by the relative shifting of the first supporting member 110C and the second supporting member 120C.

In a case where the first supporting member-side rib region 150C(1) is provided on the lower side (a side facing the disk) of the mount hole 111 unlike in the case of the present embodiment, the second supporting member-side rib region 150C(2) is provided on a side of the upper surface (a side opposite from the disk) of the main body region 121.

Fourth Embodiment

Hereinafter, still another embodiment of the magnetic head suspension according to the present invention will be described, with reference to the attached drawings.

FIGS. 13A-13C are top, side and bottom views of a magnetic head suspension 1D according to the present embodiment, respectively.

In the figures, the members same as those in the first to third embodiments are denoted by the same reference numerals to omit the detailed description thereof.

The magnetic head suspension 1D is different from the magnetic head suspensions according to the pervious explained embodiments and modifications in that the supporting parts 10A-10C are replaced by a supporting part 10D.

As shown in FIGS. 13A-13C, the supporting part 10D includes a first supporting member 110D with which the load bending part 20 is connected, and a second supporting member 120D that is formed separately from the first supporting member 110D and includes the boss portion 15.

Figure 14A:
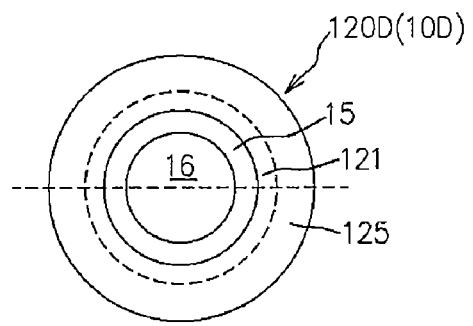
FIGS. 14A and 14B are a top view and a vertical cross sectional view of a second supporting member of a supporting part of the magnetic head suspension according to the fourth embodiment, respectively.
Figure 14B:
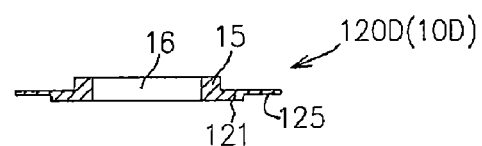

FIGS. 14A and 14B are a top view and a vertical cross sectional view of the second supporting member 120D, respectively.

Figure 14C:
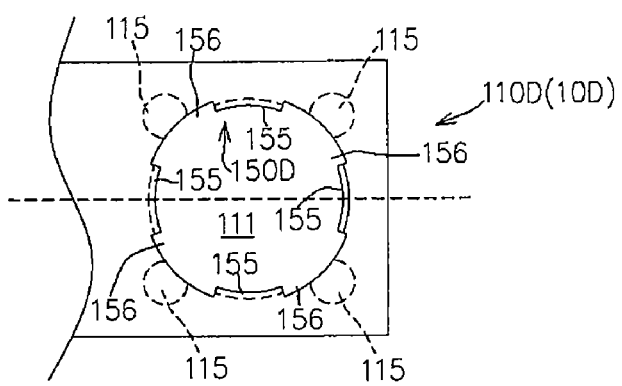
FIGS. 14C and 14D are a top view and a vertical cross sectional view of a first supporting member of the supporting part, respectively.
Figure 14D:
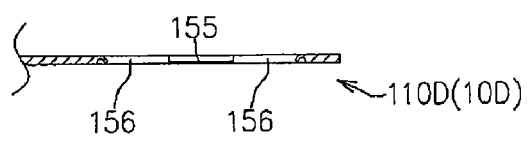

FIGS. 14C and 14D are a top view and a vertical cross sectional view of the first supporting member 110D, respectively.

Figure 14E:
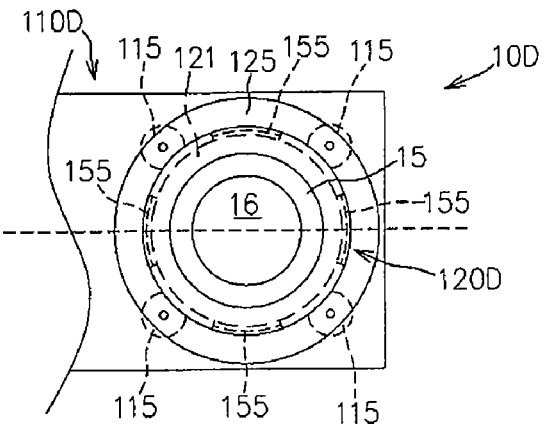
FIGS. 14E and 14F are a top view and a vertical cross sectional view of the first and second supporting members connected with each other, respectively.
Figure 14F:
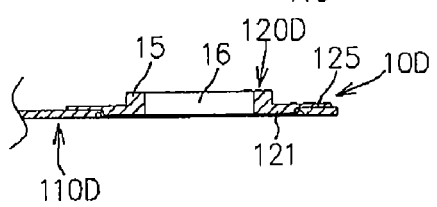

FIGS. 14E and 14F are a top view and a vertical cross sectional view of the first and second supporting members 110D and 120D connected with each other, respectively.

As shown in FIGS. 14C and 14D, the first supporting member 110D has a rib region 150D that is extended radially inward from the inner periphery of the mount hole 111 so as to have a surface that is in the plane identical with one of the upper and lower surfaces (the upper surface in the present embodiment) of the first supporting member 110D.

As shown in FIGS. 14A and 14B, the second supporting member 120D has, in addition to the boss portion 15 and the main body region 121, an extended region 125 that extends radially outward from the main body region 121.

The extended region 125 is provided so as to have a surface that is in the plane identical with one of the upper and lower surfaces (the upper surface in the present embodiment) of the main body region 121, which is located on the side identical with the one of the surfaces including the rib region 150D in the first supporting member 110D.

In a state where the first supporting member 110D and the second supporting member 120D are connected with each other due to the restoring force of the rib region 150D that has been elastically deformed and/or plastically deformed by inserting the main body region 121 of the second supporting member 120D into the mount hole 111 of the first supporting member 110D, the other one of the upper and lower surfaces (the lower surface in the present embodiment) of the extended region 125 comes into contact with one of the surfaces (the upper surface in the present embodiment) of the first supporting member 110D, and the extended region 125 and the first supporting member 110D are fixed to each other by welding or the like.

More specifically, in the present embodiment, the first and second supporting members 110D and 120D are connected with each other by fixing the extended region 125 to the first supporting member 110D in addition to the restoring force of the rib region 150D that has been elastically deformed and/or plastically deformed, thereby achieving a more stable connection between the first and second supporting members 110D and 120D.

In the present embodiment, as shown in FIG. 14C, the rib region 150D has a plurality of ribs 155 that are circumferentially aligned on the inner periphery of the mount hole 111 with the gaps 156 each being interposed therebetween. Alternatively, the rib region 150D may have a single rib that extends over the entire circumference of the inner periphery of the mount hole 111.

In the present embodiment, as explained above, the extended region 125 comes into contact with the upper surface of the first supporting member 110D. Alternatively, the extended region 125 can be provided so as to come into contact with the lower surface of the first supporting member 110D.

In the modification, the rib region 150D is provided on a side of the lower surface of the mount hole 111, and the extended region 125 is provided on a side of the lower surface of the main body region 121.

In a state where the first and second supporting members 110D and 120D are connected to each other by the restoring force of the rib region 150D that has been elastically deformed and/or plastically deformed in accordance with insertion of the main body region 121 of the second supporting member 120D into the mount hole 111 of the first supporting member 11D, the upper surface of the extended region 125 is overlapped with the lower surface of the first supporting member 110D while the extended region 125 and the first supporting member 110D being fixed to each other by welding or the like.

Reference numeral 115 in FIGS. 13A-13C and FIGS. 14A-14F denotes concave portions formed at a lower surface of the first supporting member 110D so as to be opened to a side facing the disk. The concave portions 115 are needed in a case of welding the extended region 125 and the first supporting member 110D from the side facing the disk if needed or desired. Small circles in FIGS. 13C and 14E denote welding points.

Although the present invention is explained in the previous embodiments and modifications, taking as an example a case where the main body region of the second supporting member has a circular shape and the mount hole of the first supporting member has a circular shape accordingly, it is of course not limited to this configuration.

For example, the main body region of the second supporting member may have a rectangle shape. In this case, the mount hole of the first supporting member is configured so as to have a rectangle shape in accordance with the outer shape.

What is claimed is:

1. A magnetic head suspension comprising:
   a supporting part having a boss portion fixed to a carriage arm by swaging, the carriage arm being connected to an actuator,
   a load bending part that is supported by the supporting part and generates a load for pressing a magnetic head slider toward a disk surface,
   a load beam part that is supported by the supporting part through the load bending part and transmits the load to the magnetic head slider, and a flexure part that is supported by the load beam part while supporting the magnetic head slider,
   wherein the supporting part includes a first supporting member with which the load bending part is connected, and a second supporting member that is provided separately from the first supporting member and includes the boss portion and a main body region extended radially outward from an outer periphery of the boss portion,
   wherein the first supporting member is provided with a mount hole that has a shape corresponding to the outer periphery of the main body region in the second supporting member and has a diameter larger than that of the main body region,
   wherein at least one of the inner periphery of the mount hole and the outer periphery of the main body region is integrally provided with a rib region, and
   wherein the first and second supporting members are connected to each other by a restoring force of the rib region that has been elastically and/or plastically deformed by the other one of the inner periphery of the mount hole and the outer periphery of the main body region with the main body region being located at least partially in the mount hole in a through-thickness direction.

2. A magnetic head suspension according to claim 1, wherein the rib region that has been elastically and/or plastically deformed is within a range of a thickness of the first supporting member.

3. A magnetic head suspension according to claim 1, wherein the rib region includes a single rib that is formed so as to extend continuously and entirely along one of the inner periphery of the mount hole and the outer periphery of the main body region.

4. A magnetic head suspension according to claim 1, wherein the rib region has a plurality of ribs that are circumferentially aligned with gaps each being interposed therebetween on one of the inner periphery of the mount hole and the outer periphery of the main body region.

5. A magnetic head suspension according to claim 1,
   wherein the rib region has a first supporting member-side rib region extending radially inward from the inner periphery of the mount hole, and a second supporting member-side rib region extending radially outward from the outer periphery of the main body region,
   wherein the first supporting member-side rib region has, on the inner periphery of the mount hole, a plurality of first supporting member-side ribs that are circumferentially aligned with gaps each being interposed therebetween,
   wherein the second supporting member-side rib region has, on the outer periphery of the main body region, a plurality of second supporting member-side ribs that are circumferentially aligned with gaps each being interposed therebetween, and
   wherein the first supporting member-side ribs and the second supporting member-side ribs are displaced from one another in a circumferential direction.

6. A magnetic head suspension according to claim 1,
wherein the second supporting member further has an extended region that is extended radially outward from the main body region,
wherein the rib region is extended radially inward from the inner periphery of the mount hole in a state of having a surface that is flush with one of the upper and lower surfaces of the first supporting member,
wherein the extended region has a surface that is flush with one of the upper and lower surfaces of the main body region, which is located on the same side as the one of the upper and lower surfaces of the first supporting member, and
wherein the extended region and the first supporting member are fixed to each other in a state where the other one of the upper and lower surfaces of the extended region come into contact with the one of the upper and lower surfaces of the first supporting member.

7. A magnetic head suspension according to claim 1,
wherein the supporting part includes a third supporting member with a through hole that has a diameter larger than that of a boss hole in the boss portion as well as smaller than that of the mount hole, and
wherein the third supporting member is fixed to both of the first supporting member and the main body region of the second supporting member in a state where the through hole is surrounded by the mount hole while surrounding the boss hole.

* * * * *